US005595475A

United States Patent [19]

Weiss et al.

[11] Patent Number: 5,595,475

[45] Date of Patent: Jan. 21, 1997

[54] AGITATING ELEMENT

[75] Inventors: Hans J. Weiss, Kondern; Peter Forschner, Hasel; Rainer Krebs; Reinhard Geisler, both of Schopfheim, all of Germany

[73] Assignee: EKATO Rühr- und Mischtechnik GmbH, Schopfheim, Germany

[21] Appl. No.: 375,956

[22] Filed: Jan. 20, 1995

[30] Foreign Application Priority Data

Jan. 20, 1994 [DE] Germany .......................... 44 01 596.8

[51] Int. Cl.[6] ....................................................... B64C 11/16

[52] U.S. Cl. ......................................... 416/223 R; 416/228

[58] Field of Search ................................ 416/223 R, 228, 416/231 A

[56] References Cited

U.S. PATENT DOCUMENTS 3,477,381 11/1969 Becker ................................ 415/182.1

4,142,837 3/1979 de Simone .......................... 416/223 R 5,174,721 12/1992 Brocklehurst ........................ 416/223 R 5,199,851 4/1993 Perry et al. .......................... 416/223 R 5,246,344 9/1993 Perry ........................................ 416/228

5,320,494 6/1994 Reinfelder et al. ..................... 416/228

*Primary Examiner*—John T. Kwon

*Attorney, Agent, or Firm*—Woodcock Washburn Kurtz Mackiewicz & Norris

[57] ABSTRACT

The present invention generally pertains to an agitating element for agitating low-to-medium-viscosity liquids. The agitating element comprises an inner main blade and an outer side blade, and the two blades are integrally constructed. The main blade is angled with respect to the rotation axis of the agitating element, while the side blade is angled with respect to the rotation plane of the agitating element. The agitating element according to the current invention enables high hydraulic efficiency especially in a vertical direction so as to accomplish thorough mixing of the material with a minimal energy input.

24 Claims, 4 Drawing Sheets

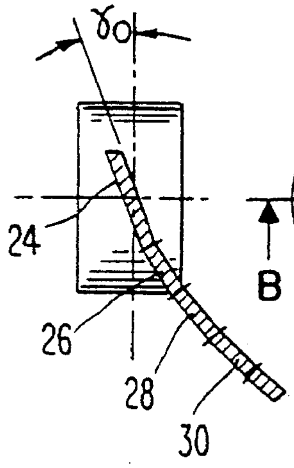
Fig. 3a
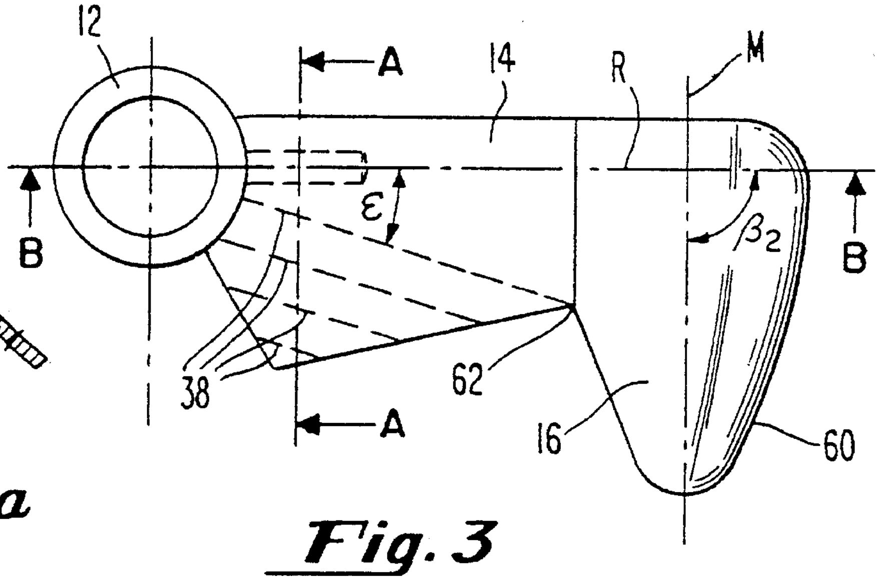
Fig. 3
Fig. 4a
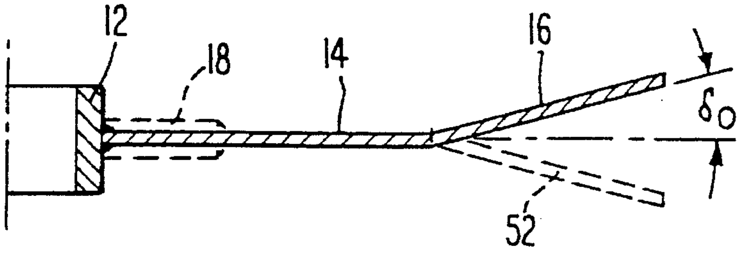
Fig. 4b
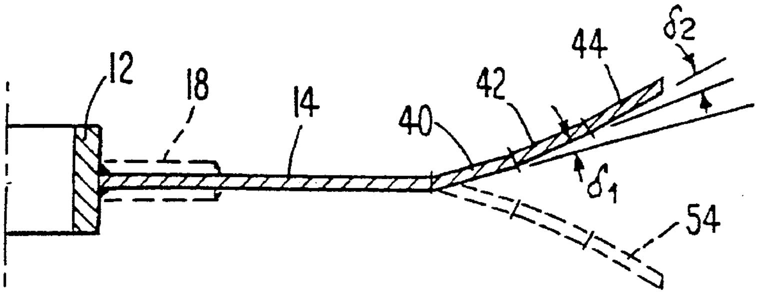
Fig. 4c
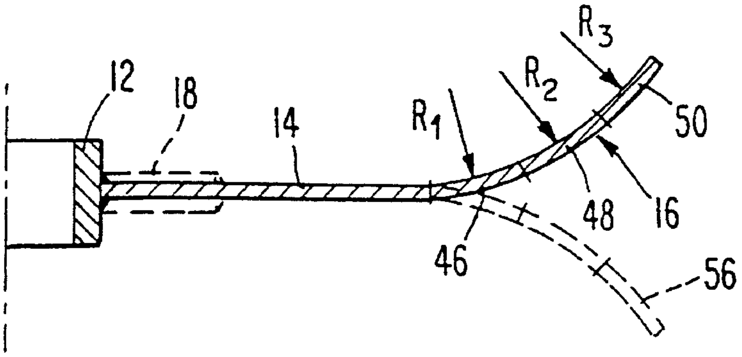

AGITATING ELEMENT

FIELD OF THE INVENTION

The current invention generally pertains to an agitating element for agitating low-to-medium viscosity liquids in a vessel. More particularly, the current invention is related to an agitating element having a configuration of an inner main blade and an outer side blade for increasing vertical flow of the liquids in the vessel during agitation.

BACKGROUND OF THE INVENTION

Agitating elements are used for mixing liquids in a vessel. Some of these conventional agitating elements include agitating blades of constant width while others include blades that taper off toward one end. In addition to these agitating elements, propeller agitators are also used to mix liquids in a container. These propellers are usually symmetrical and have trailing agitating blades.

FIG. 7 shows a one-half cross sectional view of one example of such a conventional agitating device. A rotating shaft 62 is placed in a vessel 60, and a prior art agitating element 61 is connected to the rotating shaft via a hub 12. When the conventional agitating element 61 is rotated to agitate materials in a vessel 60, the agitating element 61 tends to generate short circuited fluid flows 64 as indicated by the arrows near the agitating element 61. An area of the short circuited flows 64 is essentially stagnant and considered as a dead zone. Because of these local short circuited flows, the material near the agitating element 61 is circulated only in the vicinity of the agitating element 61 and does not travel over a significant vertical distance. As a result, the material near the bottom and near the top of the vessel 60 are not mixed together. The above described separation problem becomes more serious when material is to be mixed using a conventional agitating element in a deep vessel.

A prior attempt to solve the above described problem included a control of axial velocities generated by an agitating element. Although the prior attempt distributed axial velocities more or less uniformly on the discharge surface of the agitating element, the short circuited flow was not effectively controlled. Other attempts included agitating elements that were manufactured based upon the lifting surface theory. However, these prior art agitating elements also failed to suppress a short circuit flow near the agitating element, and their efficiency for mixing material did not significantly improve.

SUMMARY OF THE INVENTION

Due to the lack of sufficient vertical flow of the material, the use of conventional agitating elements has failed to achieve a high efficiency in mixing the materials in a vessel. Accordingly, the objective of the present invention is to provide an agitating element which maximizes a hydraulic efficiency for vertical flow of material while minimizing the above-described short circuited flow in the vicinity of the agitating element.

According to the present invention, this objective is accomplished by an agitating element that includes an inner main blade and an outer side blade. The main blade is connected to a rotating shaft and is placed at a first predetermined angle to the axis of rotation. The side blade is connected to the main blade at a second predetermined angle with respect to a plane of rotation.

According to one aspect to the current invention, the ratio of the length of the side blade to the external diameter of the agitating element is preferably in the range of approximately 0.15 to approximately 0.4.

According to a second aspect of the current invention, the first predetermined angle is in the range of approximately 15° to approximately 29° while the second predetermined angle is in the range of approximately –25° to approximately +25°.

According to a third aspect of the current invention, the main blade includes at least a first section and a second section, and the second section of the main blade is angled at a third predetermined angle with respect to the first section.

According to a fourth aspect of the current invention, the third predetermined angle between the first section and the second section of the main blade is in the range of approximately 7° to approximately 19°.

According to a fifth aspect of the current invention, the first section and the second section of the main blade are at least partially curved.

According to a sixth aspect of the current invention, the ratio of the radius of these curved sections of the main blade to the external diameter of the agitating element is preferably in the range of approximately 0.15 to approximately 0.8.

According to a seventh aspect of the current invention, the side blade includes at least a first section and a second section.

According to a eighth aspect of the current invention, the curvature of the first section and that of the second section of the side blade has a different radius, and the ratio of each of these radii to the external diameter of the agitating element is preferably in the range of approximately 0.1 to approximately 0.8.

According to a ninth aspect of the current invention, a line connecting the main blade and the side blade intersects the radial center line of the main blade at an angle of approximately 70° to approximately 95°, while the center line of the side blade intersects the radial center line of the main blade at an angle of approximately 60° to 110°.

Finally, according to the tenth aspect of the current invention, the outer edge of the side blade correspond to a circumferential line of the agitating element when the agitating element is rotated.

BRIEF DESCRIPTION OF THE DRAWINGS

FIG. 3 shows a top view of another embodiment of the agitating element according to the present invention.

FIG. 3*a* shows a sectional view of the main blade along a line A—A in FIG. 3.

FIGS. 4*a*, 4*b* and 4*c* show axial sections of various embodiments of the side blade along a line B—B in FIG. 3.

DETAILED DESCRIPTION OF THE INVENTION

Figure 1:
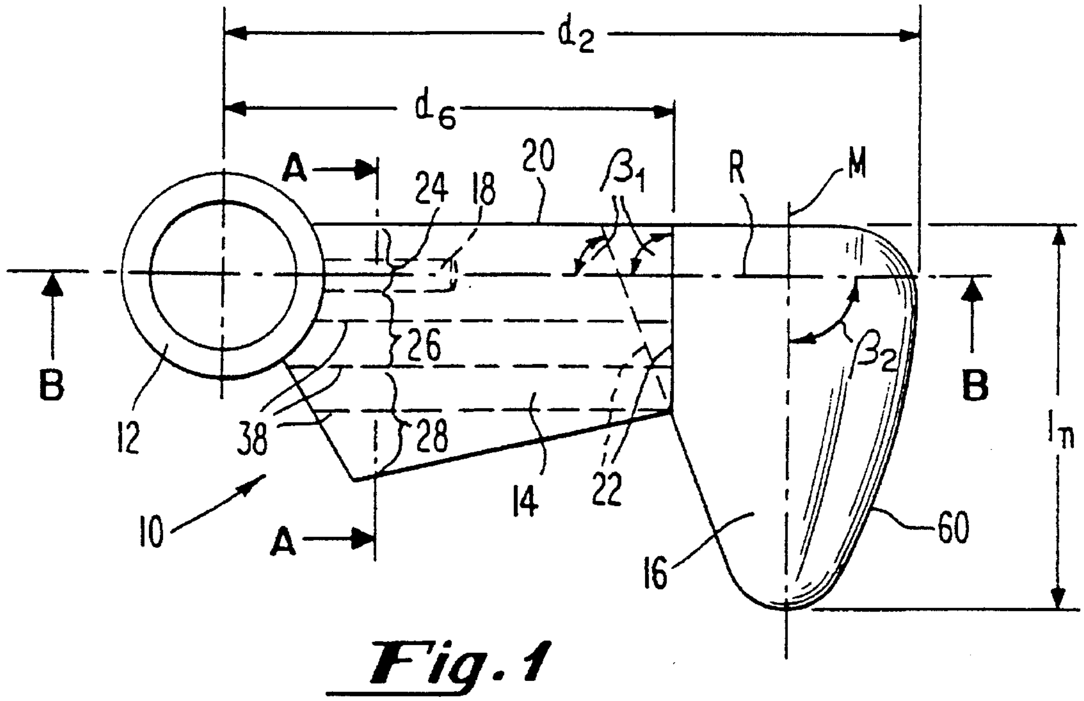
FIG. 1 shows a schematic top view of an agitating element according to the present invention.

The agitating element 10 according to the current invention as shown in FIG. 1 is fastened to a rotating shaft via a hub 12 and includes an inner main blade 14 proximal to the hub 12 and an outer side blade 16 connected to a distal end of the main blade 14. The main blade 14 may be directly welded to the hub 12 with or without an additional fastening element such as a strut 18. The side blade 16 is rigidly and integrally connected to the main blade 14 by welding or the like. In the alternative, the two blades 14, 16 may be casted into one piece or they may be pressed from a single piece of flat sheet metal. The thickness of the two agitator blades 14, 16 may be equal in certain embodiments while the outer blade 16 may be thinner than the main blade in other embodiments.

Still referring to FIG. 1, the two agitator blades 14, 16 have a common front edge 20, which extends in parallel to a radial line R, which passes through the center of the hub 12. A hypothetical line 22 connecting the main blade 14 and the side blade 16 intersects the radial line R at an angle $\beta_1$. As shown in FIG. 1, depending upon how the line 22 is selected, the angle $\beta_1$ varies. A center line M extending along the center of the side blade 16 in the long axis direction forms an angle $\beta_2$ with respect to the radial line R. The angle $\beta_1$ is in the range of approximately 70° to approximately 95°, while the angle $\beta_2$ is in the range of approximately 60° to approximately 110°.

In addition to above angular specifications of the agitating element 10, the following will specify other structural specifications. The ratio of the length $l_n$ of the side blade 16 to the external diameter $d_2$ of the agitating element 10 is in the range of approximately 0.15 to approximately 0.4. The ratio of the inner diameter $d_6$ of the line 22 connecting the main blade 14 and the side blade 16 to the external diameter $d_2$ of the agitating element 10 is in the range of approximately 0.25 to approximately 0.45.

As shown in FIG. 1, the main blade 14 tapers off radially as it extends from the hub 12 towards the side blade 16. According to the current invention, in one preferred embodiment, corners of the main blade 14 are pointed as shown in FIG. 1. In contrast, the side blade 16 is rounded at the front and rear corners in this embodiment. In addition, its outer edge or contour 60 of the side blade 16 substantially correspond to the circumferential line of the agitating element 10 as the agitating element is rotated.

Figure 2A:
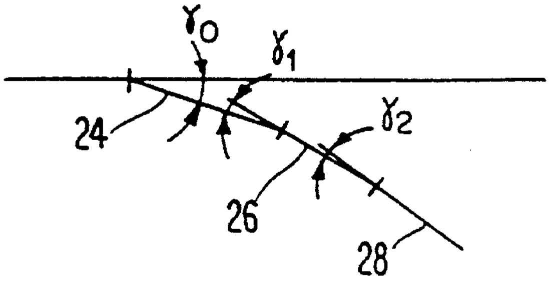
FIGS. 2*a*, 2*b* and 2*c* show sectional views of various embodiments of the main blade along a line A—A in FIG. 1.

FIG. 2*a* shows a cross sectional view of the main blade 14 taken at a line A—A in FIG. 1. The main blade 14 consists of three sections 24, 26 and 28. The first section 24 is disposed at an angle $\gamma_0$ of approximately 15° to approximately 29° with respect to the axis of rotation of the agitating element 10. The section 24 is connected to at least one additional section 26. The section 26 is placed at an angle $\gamma_1$ with respect to the section 24 along an edge of the section 24. The edge of the section 24 is parallel to the radial line R in a first embodiment as shown in FIG. 1 while the same edge forms an angle $\epsilon$ with respect to the radial line R in a second embodiment as shown in FIG. 3. The section 26 may be further connected to another section 28, which is placed at an angle $\gamma_2$ with respect to the section 26 along an edge of the section 26.

Figure 2B:
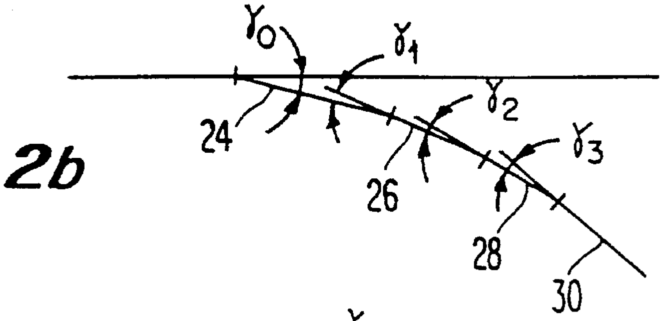

FIG. 2*b* show a comparable cross sectional view of an alternative embodiment of the main blade 14. The main blade 14 consists of four sections 24, 26, 28 and 30. In the embodiment as shown in FIG. 2*b*, the section 28 is connected to yet another section 30, which is placed at an angle $\gamma_3$ with respect to the section 28 along an edge of the section 28. As described above, the edges of the section 26 and 28 are each parallel to the radial line R in a first embodiment as shown in FIG. 1 while the same edges each form an angle $\epsilon$ with respect to the radial line R in a second embodiment as shown in FIG. 3. In either embodiment, the angles $\gamma_1$, $\gamma_2$ and $\gamma_3$ are respectively in the range of approximately 7° to approximately 19° with respect to the axis of rotation of the agitating element, and the widths of the sections 24, 26, 28 and 30 may be different.

Figure 2C:
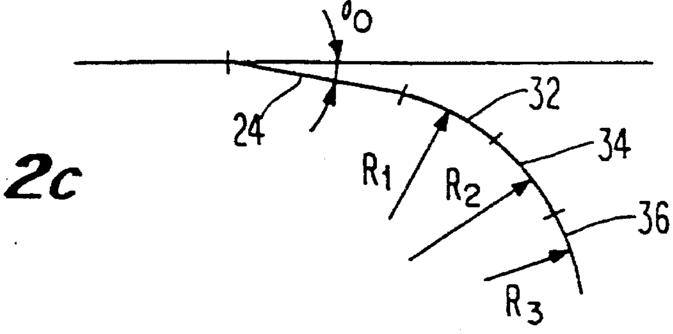

In contrast to the flat individual sections 24, 26, 28 and 30, FIG. 2*c* illustrates another embodiment in which the main blade 14 comprises curved sections. As shown in a cross sectional view in FIG. 2*c*, the curved sections may each have a different radius. The first section 24 is flat and is disposed at an angle of attack $\gamma_0$ with respect to the axis of rotation of the agitating element 10. The section 24 is connected to a curved section 32 having a radius R1 and then to other curved sections 34 and 36 with respective radii R2 and R3. The ratio of each of the radii R1, R2 and R3 to the external diameter $d_2$ of the agitating element 10 is in the range of approximately 0.15 to approximately 0.8. Although the embodiment as shown in FIG. 2*c* has curved sections with different radii, according to the current invention, the curved sections may have a uniform curvature.

The various configurations of the main blade as shown in FIGS. 2*a*, 2*b* and 2*c* may also be combined with the other embodiments as shown in FIGS. 3 through 6 and as will be described below to create an agitating element suitable for mixing particular materials.

FIGS. 3 shows that the hypothetical lines 38 on the main blade 14 and the radial line R form an acute angle $\epsilon$. The angle $\epsilon$ is generally in the range of approximately 5° to approximately 30°, and preferably in the range of approximately 10° to approximately 23°. The hypothetical lines 38 extend substantially in parallel to one another, and the innermost line 38 that is closest to the radial line R intersect the corner point 62, where the trailing edge of the main blade 14 and the side blade 16 meet.

FIG. 3*a* shows a cross sectional view of the main blade 14 taken along a line A—A in FIG. 3. As in the embodiments as shown in FIGS. 2*a*, 2*b* and 2*c*, the main blade 14 may consist of a flat section 24, which is disposed at an angle $\gamma_0$ with respect to the axis of rotation of the agitating element 10. The section 24 may be connected to additional flat sections 26, 28, and 30 at the respective angles $\gamma_1$, $\gamma_2$ and $\gamma_3$. In the alternative, the section 24 of FIG. 3*a* may be connected to additional curved sections 32, 34 and 36 with the respective radii R1, R2 and R3 as shown in FIG. 2*c*.

FIGS. 4*a*, 4*b* and 4*c* show a cross sectional view taken along a line B—B which is perpendicular to the axis of the rotation as shown in FIGS. 3 and 3*a*. A cross sectional view as shown in FIG. 4*a* illustrates that the side blade 16 is angled away from the bottom of an agitation tank at an angle $\delta_0$ with respect to the main blade 14 or a plane of rotation generated by the main blade 14. Although the agitation tank is not shown in FIG. 4*a*, the bottom of the tank is below the cross section of the main blade 14. In the alternative embodiment, the side blade 52 is angled in the opposite direction towards the bottom of the agitation tank at the angle $\delta_0$ with respect to the main blade 14 as shown in a dotted line in FIG. 4*a*. In either embodiment, the value of the angle $\delta_0$ is preferably in the range of approximately −25° to +25°.

In another embodiment as shown in FIG. 4*b*, the side blade 16 comprises at least three flat sections 40, 42 and 44. The inner most section 40 forms the aforementioned angle $\delta_0$ with respect to the main blade 14 as shown in FIG. 4*a*. The section 40 is connected to the section 42, which is placed at an angle $\delta_1$ with respect to the section 40 as shown in FIG. 4*b*. The section 42 is further connected to the section 44 at an angle $\delta_2$ with respect to the section 44. These sections 40, 42 and 44 are angled away from the bottom of the agitation tank. In the alternative embodiment, the side blade sections 54 are connected at angles towards the bottom of the agitation tank as shown in dotted line in FIG. 4*b*. The angles $\delta_1$ and $\delta_2$ are in the range of ca. 0° to approximately 15°, and the sections 40, 42 and 44 are increasingly angled away from the bottom of the agitation tank as they are connected more distally to the hub. The widths of the individual sections 40, 42 and 44 may be different.

In relation to FIG. 3, the side blade sections 40, 42 and 44 are connected with each other in the following predetermined direction. That is, hypothetical lines connecting between the sections 40 and 42 as well as between the sections 42 and 44 are substantially parallel to the center line M of the side blade 16. The center line M in turn forms an angle $\beta_2$ with the radial line R.

FIG. 4*c* shows an alternative embodiment in which the additional sections of the side blade 16 are curved. The curvature of each additional section may be uniform or different according to the current invention. FIG. 4*c* shows one example of the curved side blade 16 that comprises a plurality of sections each with a predetermined curvature. The main blade 14 is connected to one end of a first curved section 46 having a radius R1. The first curved section at the other end is connected to one end of a second curved section 48 with a radius R2. The other end of the second curved section is connected to a third curved section 50 with a radius R3.

The transition between the main blade 14 and the first curved section 46, as well as the transition between the individual curved sections 46, 48 and 50 is substantially tangential. Although an agitation tank is not shown in FIG. 4*c*, the side blade 16 curves continuously upward away from the bottom of an agitation tank. In the another embodiment, the curved side blade 56 is curved downwardly toward the bottom of the agitation tank as indicated by the dotted line in FIG. 4*c*. The ratio of each of the radii R1, R2 and R3 to the external diameter $d_2$ of the agitating element 10 is preferably in the range of approximately 0.1 to approximately 0.8.

In summary, the side blade 16 is angled with respect to the plane of rotation as described above in reference to FIGS. 4*a*, 4*b* and 4*c*. These embodiments of the side blade 16 may also be combined with other embodiments of the main blade 14 as shown in FIGS. 1, 2*a*, 2*b* and 2*c* to create an agitating element suitable for mixing particular materials.

Figure 5:
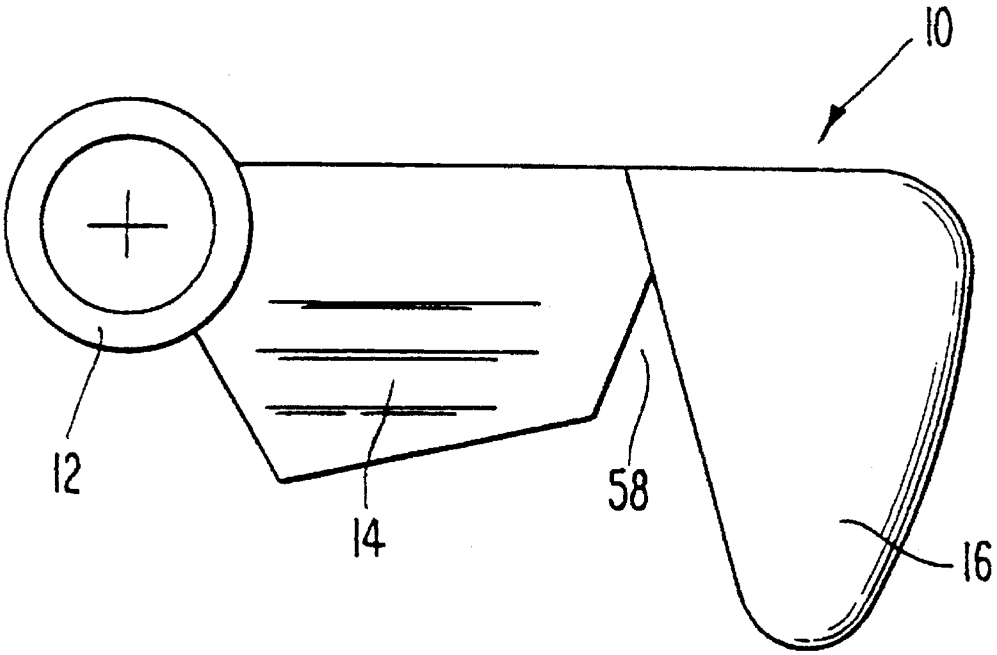
FIGS. 5 and 6 show yet other embodiments of the agitating element according to the current invention.

FIG. 5 shows an additional embodiment of the agitating element derived from one shown in FIG. 1. A cut 58 is provided between the main blade 14 and the side blade 16. The side blade 16 is connected to a reduced width portion of the main blade 14.

Figure 6:
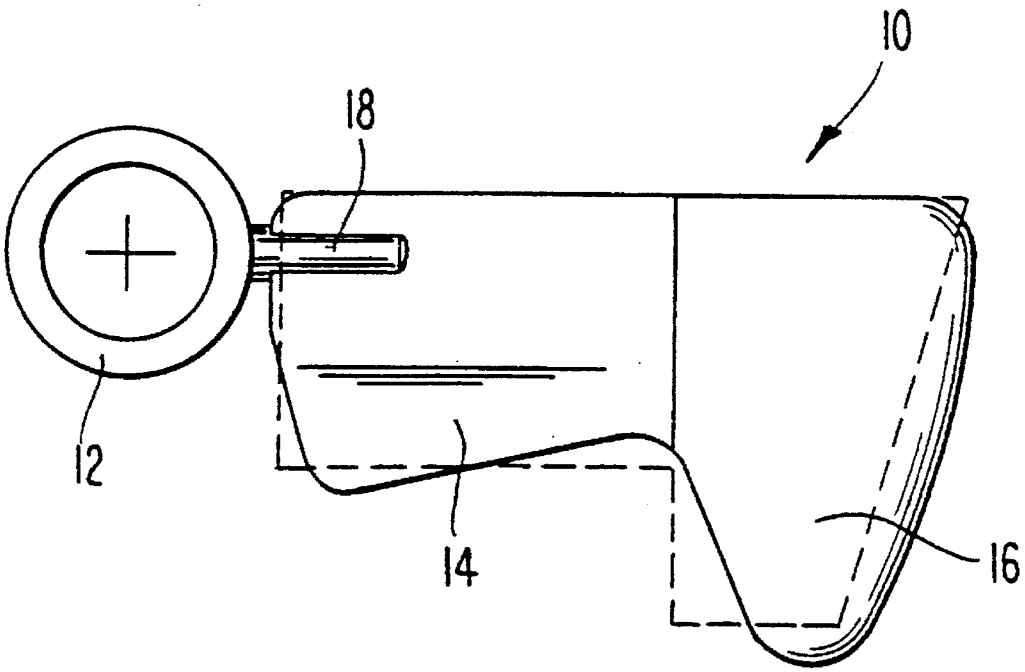
Figure 7:
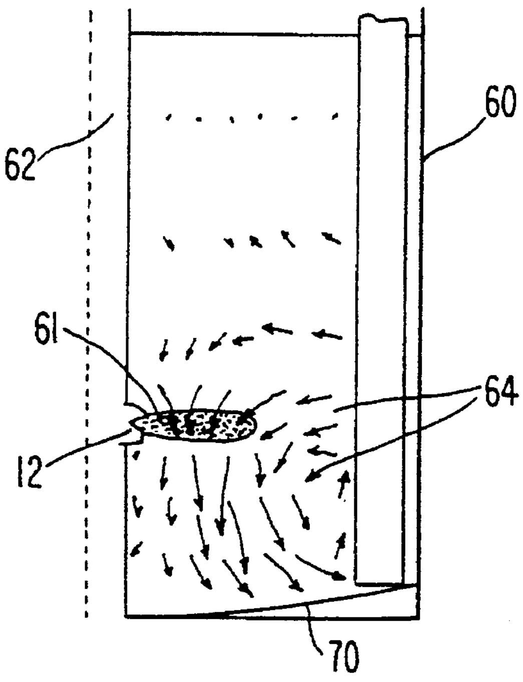
PRIOR ART Fig. 7
FIG. 7 shows a one half cross sectional view of a vessel along with a conventional agitating element to illustrate a flow of material during agitation.

FIG. 6 shows yet another embodiment of the agitating element 10, in which the main blade 14 is fastened to a strut 18 and not directly contacting the hub 12. The corners of the main blade 14 are rounded, and the transition between the main blade 14 and the side blade 16 is also rounded. Still referring to FIG. 6, the dotted lines show a contrasting angular design of an agitating element 10. These angular and rounded designs as well as other designs of the main and side blades are combined to create an agitating element suitable for mixing particular materials. In addition, under certain circumstances, a plurality of agitating elements may be configured on the same rotating shaft.

As described above, the agitating element is used for mixing low-to-medium viscous liquids of a single or multiphase placed in a round or rectangular tank. In mixing the liquids by the agitating element according to the current invention, the ratio of the external diameter of the agitating element to the internal diameter of the agitation tank is preferably between approximately 0.2 and approximately 0.7. However, the tank size significantly varies and ranges from approximately 0.5 m to more than approximately 20 m in diameter.

Figure 8:
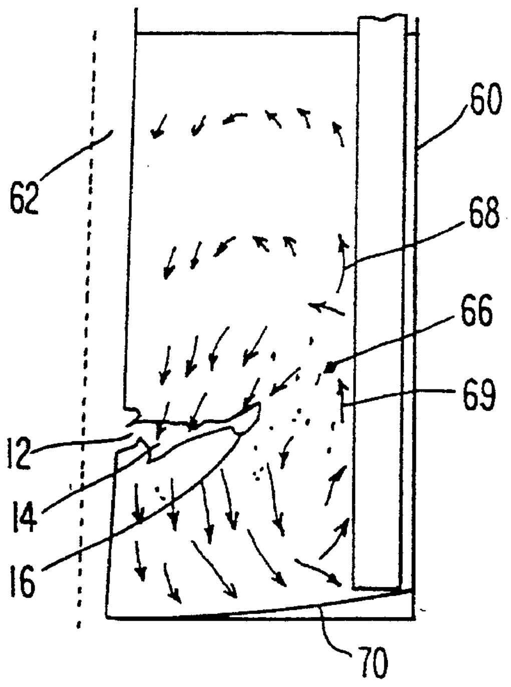
FIG. 8 shows a one half cross sectional view of a vessel along with one embodiment of the agitating element according to the current invention to illustrate an increased vertical flow of material during agitation.

Referring to FIG. 8, the above described agitating element of the current invention is placed in a vessel 60 for mixing material contained therein. The agitating element includes a main blade 14 connected to a rotating shaft 62 via a hub 12. The side blade 16 is connected to a radial edge of the main blade 14. When the agitating element is rotated in the vessel, due to the angles of these blades with respect to the rotation axis and plane, the main blade 14 and the side blade 16 significantly enhance a vertical flow of material in a mixing vessel as indicated by arrows 68 and 69. As a result, the short-circuited flows in the vicinity 66 of the agitating element are substantially eliminated by the agitating element according the current invention. This improvement leads to a broadened axial profile on the pressure side of the agitating element and is also accompanied by a marked increase in efficiency.

The agitating element according to the present invention may be manufactured with metallic or plastic material. The surface may be treated, sand-blasted, polished, lined, coated, rubberized or enameled. It may be used with or without agitator baffle(s) in the agitation tank, and it may be mounted centrally, eccentrically or obliquely on the rotating shaft and located in the agitation tank.

In summary, the present invention is directed to an agitating element for agitating low-to-medium-viscous liquids with high hydraulic efficiency. Thorough mixing of the material is accomplished with minimal energy by the above described agitating element according the current invention.

It is understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed:

1. An agitating element fastened to an agitator shaft for agitating low-to-medium-viscosity liquids, comprising:

an inner main blade disposed at a predetermined angle ($\gamma_0$) to said agitator shaft; and an outer side blade connected to said inner main blade, said side blade forming a predetermined angle ($\delta_0$) with said main blade wherein a ratio of a predetermined length ($l_n$) of said side blade to the external diameter ($d_2$) of the said agitating element ranges from approximately 0.15 to approximately 0.4.

2. The agitating element in accordance with claim 1 or 2, wherein a value of the predetermined angle ($\gamma_0$) ranges from approximately 15° to approximately 29°.

3. The agitating in accordance with one of the claim 3, wherein a value of the predetermined angle ($\delta_0$) ranges from approximately −25° to approximately +25°.

4. The agitating in accordance with claim 4, wherein along a line forms an predetermined angle ($\epsilon$) with a radial line (R) of the said main blade, the said main blade having a first section and a second section, said second section being placed at a predetermined angle ($\gamma_1$) with respect to said first section of the said main blade.

5. The agitating in accordance with claim 4, wherein the said second section of the said main blade is connected to additional sections at a respective predetermined angle $\gamma_2$ and $\gamma_3$.

6. The agitating in accordance with claim 5, wherein each of the predetermined angles $\gamma_1$, $\gamma_2$ and $\gamma_3$ ranges from approximately 7° to approximately 19°.

7. The agitating in accordance with claim 6, wherein the said main blade is at least partially curved.

8. The agitating in accordance with claim 4, wherein the said first section is connected to at least one of a plurality of curved sections with the respective predetermined radii R1, R2 and R3.

9. The agitating in accordance with claim 8, wherein a ratio of each of said predetermined radii R1, R2 and R3 to the external diameter ($d_2$) of the said agitating element ranges from approximately 0.15 to approximately 0.8.

10. The agitating in accordance with claim 1, wherein said side blade further comprises a first section and additional sections, said first section of the said side blade which forms an angle ($\delta_0$) relative to the said main blade being connected to at least one of said additional sections at predetermined angles $\delta_1$ and $\delta_2$ along lines parallel to a center line M of the said side blade, said center line M forming a predetermined angle $\beta_2$ with a radial line R of the said main blade.

11. The agitating in accordance with claim 10, wherein the predetermined angles $\delta_1$ and $\delta_2$ range from approximately 0 to approximately 15°.

12. The agitating in accordance with claim 11 wherein the predetermined angle $\beta_2$ ranges from approximately 60° to approximately 110°.

13. The agitating in accordance with claim 12, wherein a axial section of the said side blade is at least partially curved.

14. The agitating in accordance with claim 1, wherein the said side blade further comprises at least three additional curved sections with respective predetermined radii R1, R2 and R3.

15. The agitating in accordance with claim 14 wherein a ratio of each of the predetermined radii R1, R2 and R3 to the external diameter ($d_2$) of the said agitating element ranges from approximately 0.1 to 0.8.

16. The agitating in accordance with claim 15 wherein the a line connecting the said main blade to said side blade and a radial line R of the said main blade form a predetermined angle $\beta_1$ which ranges from approximately 70° to approximately 95°.

17. The agitating in accordance with claim 16 wherein said outer edge of the said side blade correspond to a circumferential line of the said agitating element.

18. The agitating in accordance with claim 17 wherein a ratio of a predetermined diameter ($d_6$) of the said main blade to the external diameter ($d_2$) of the said agitating element ranges from approximately 0.25 to approximately 0.45.

19. The agitating in accordance with claim 18 wherein a ratio of the external diameter ($d_2$) of the said agitating element to the internal diameter of the agitated tank ranges from 0.02 to 0.7.

20. An agitating element fastened to an agitator shaft for agitating low-to-medium-viscosity liquids, comprising:

an inner main blade disposed at a predetermined angle ($\gamma_0$) to said agitator shaft; and an outer side blade connected to said inner main blade, said side blade forming a predetermined angle ($\delta_0$) with the said main blade, whereby a ratio of a predetermined length ($l_n$) of said side blade to the external diameter ($d_2$) of said agitating element ranges from approximately 0.15 to approximately 0.4.

21. The agitator according to claim 20, wherein said inner blade further comprises a plurality of sub inner blades, on adjacent pair of said sub inner blades being integral and configured at a predetermined angle with each other.

22. The agitator according to claim 20, wherein said inner blade further comprises a plurality of sub inner blades, said sub inner blades being integral with each other, each of said sub inner blades having a curved surface with a predetermined radius.

23. The agitator according to claim 20 wherein said outer blade further comprises a plurality of sub outer blades, an adjacent pair of said sub outer blades being integral and configured at a angle with each other.

24. The agitator according to claim 20 wherein said outer blade further comprises a plurality of sub outer blades, said sub outer blades being integral with each other, each of said sub outer blades having a curved surface with a predetermined radius.

* * * * *